3,125,408
METHOD OF REMOVING NITROGEN OXIDES FROM GASES

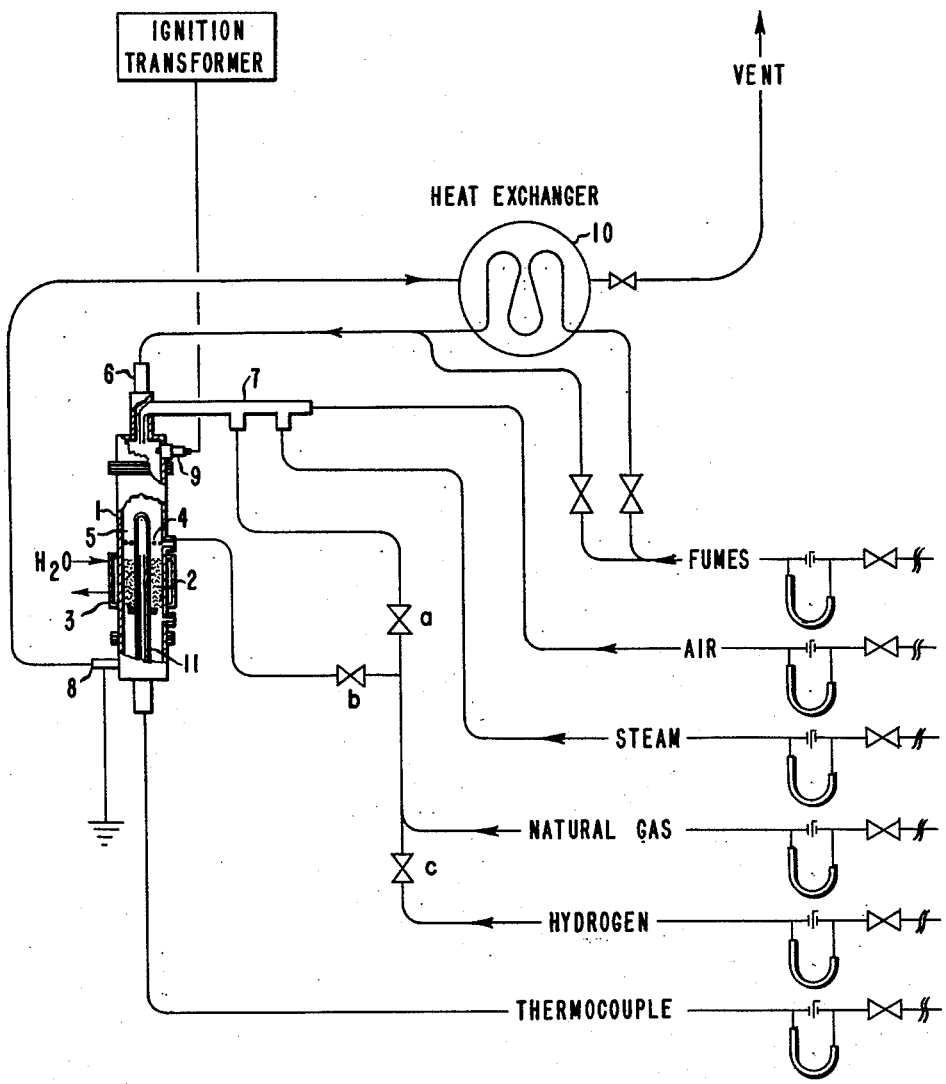

Eugene Childers, South Charleston, W. Va., and Charles William Ellis and Donald James Ryan, Orange, Tex., assignors to E. I. du Pont de Nemours and Company, Wilmington, Del., a corporation of Delaware
Filed Dec. 19, 1955, Ser. No. 553,924
1 Claim. (Cl. 23—2)

The present invention relates to a treatment of nocuous gases in order to permit their discharge into the atmosphere without danger to vegetable or animal life and more particularly relates to the reduction by catalysis of nitrogen oxides present in certain stack gases to nitrogen.

In carrying out certain chemical reactions, especially in working up oxidation and/or nitration mixtures which contain nitric acid in excess, such as those that occur in the nitric acid oxidation of cyclic alkanones and cyclic alkanols, the oxidation products of which are, on occasion, further oxidized to monobasic and dibasic organic acids, considerable quantities of nitrogen gases ($NO_2$ and $NO$) are formed. Also, in the manufacture of nitric acid by ammonia oxidation, considerable quantities of unabsorbed nitrogen gases ($NO_2$ and $NO$) are evolved. Owing to the risk of injury to vegetation and animal life and also the corrosiveness of such gases, they cannot safely be discharged directly into the atmosphere. Some form of treatment is necessary to reduce and preferably to eliminate entirely the nocuous components present in such gases.

Proposals have been made to absorb nitrogen oxide-containing gases in some effective absorption media thereby avoiding the necessity of discharging the gases into the atmosphere. An absorption plant to be effective must be of very large proportions requiring the use of considerable space and the expenditure of large sums for installation costs. The recovery of nitric acid, nitrous acid, or their salts is not usually balanced by the high installation cost, and this is particularly true in those operations in which the presence of nitric oxide, nitrogen dioxide, and nitrogen tetroxide, or complexes thereof, is 1 to 2% or less of the effluent gases. The need for a simple, inexpensive and effective method for rendering such gases innocuous is, therefore, self-evident.

An object of the invention is to reduce the nitrogen oxide content of an industrial stack gas to an innocuous level. Another object is to provide a process for reducing nitrogen oxides to nitrogen and water. A further object is to provide a process in which the nitrogen oxide content of stack gases and other effluent gases are reduced to harmless concentrations by catalytic reduction of those gases. Other objects and advantages of the invention will hereinafter appear.

The above and other objects are accomplished by subjecting stack gases, or other gases containing nitrogen oxides, to contact, at elevated temperatures and in the presence of a reducing gas such as natural gas, with or without small amounts of hydrogen, with a highly effective catalyst for the reduction. The invention will be more readily understood by reference to the drawing which illustrates diagrammatically one form of apparatus in which the process of the invention may be carried out.

The reaction converter 1 is adapted and arranged to hold a mass of catalyst in a bed. Above the catalyst bed 2, a gas sparger 4 is located in the gas inlet space 5. A major gas inlet 6, auxiliary gas inlet manifold 7, and treated gas exit 8 provide feed inlets and innocuous gas outlets from the converter 1. A spark plug 9 is placed in the inlet gas space 5 for igniting the heating gases for use in the light-off of reactions using little or no hydrogen in the natural gas. Heat exchanger 10 aids in maintaining a heat balance in the process but is not essential to the process. A thermocouple well 11 is placed in the catalyst bed 2 for temperature measurements.

Gas containing nitrogen oxides is treated in this manner. The converter 1 is charged with a suitable catalyst which is disposed in bed 2. A natural gas-air mixture is fed through manifold 7, into the gas space 5, and ignited therein by a spark from spark plug 9. The resulting gas flame is passed through the catalyst bed 2 until the catalyst has attained the desired temperature for the reaction. When that temperature has been reached, natural gas through sparger 4 and valve $b$, valve $a$ may be closed, with or without hydrogen through valve $c$, nocuous gas through heat exchanger 10, and feed inlet 6, and a controlled amount of steam or nitrogen or other inert gases through manifold 7 are introduced into the converter 1. The air is turned off prior to the introduction of fumes and the temperature of the natural gas (with or without hydrogen) and the reaction temperature are controlled by preheating the feed, or by regulating the amount of steam or nitrogen or other inert material used as a cooling medium. The nitrogen oxide gases are reduced by the natural gas in the catalyst bed 2 and the reaction products are discharged through heat exchanger 10 to a stack not shown.

The stoichiometric reducing gas requirements are based on the following equations:

$$CH_4 + 2NO_2 = CO_2 + N_2 + 2H_2O$$
$$CH_4 + 2O_2 = CO_2 + 2H_2O$$
$$CH_4 + 4N_2O = CO_2 + 4N_2 + 2H_2O$$
$$CH_4 + 4NO = CO_2 + 2H_2O + 2N_2$$
$$H_2 + NO = H_2O + \tfrac{1}{2}N_2$$
$$2H_2 + O_2 = 2H_2O$$
$$2H_2 + NO_2 = 2H_2O + \tfrac{1}{2}N_2$$
$$H_2 + N_2O = H_2O + N_2$$

The reactions are conducted at a temperature of the catalyst bed 2 between 100° C. and 1000° C. For noble catalysts, described below, temperatures may range from 100 to 1000° C., and for the metal hydrogenation catalysts, or reforming catalysts, from 450 to 1000° C., depending on the composition of the reducing gas. Pressure is generally used to the extent of 0.5 p.s.i. or higher in the inlet gas space to provide an adequate flow of gases through the catalyst bed. Higher or lower pressures may be used, however. For example, higher pressures would be desirable when power recovery is used. The amount of low temperature steam or other inert gas used is regulated to maintain the temperature within the range that is most effective for the particular catalyst.

Natural gas is preferably used in excess of that necessary to convert stoichiometrically the nitrogen oxides of the nocuous gas and/or other reducible compounds to nitrogen and water or other relatively non-toxic concentrations or materials by, inter alia, the processes of the above equations. Natural gas, methane alone, or a gas containing an alkane, may be used, such as ethane, propane, butane, etc., or mixtures thereof, or, if desired, any hydrocarbon gas of the oil or coke oven industry. While natural gas or other alkane-containing gas may be used solely as the reducing gas, one feature of the invention in which excellent heat control is attained and light-off of the reaction improved, is realized by the use of a relatively small amount of hydrogen with the methane. When hydrogen is used, it should be present in amounts up to 10 to 40% of the stoichiometric amount necessary to reduce the nitrogen oxides with the hydrocarbon constituent of the reducing gas present in sufficient amounts to complete the reaction. To insure complete reduction, the reducing gas may be used in amounts up to about 25% in excess. The gas flow, after the preheating operation, should range between 25,000 and 150,000 reciprocal hours or more (i.e. 25,000 to 150,000 S.V. the number of cubic feet (S.P.T.) of nocuous gas flowing per hour over one cubic foot of catalyst).

Catalyst requirements for the reaction are quite critical. It is necessary to have a catalyst that has a compartively low light-off temperature for the reaction, and it has been found that noble metal catalysts, supported or unsupported, favor light-off of the reaction at ambient temperatures or slightly higher. These catalysts may be used in the form of gauze, mats, or the like or may be supported on alumina or any other type of suitable inert catalyst support such as infusorial earth, kieselguhr, etc. Platinum, rhodium and palladium catalysts or mixtures of two or more noble metal catalysts are especially well adapted for the decomposition reaction and light-off at low temperatures.

Other types of catalysts may be employed providing they are sufficiently active for the decomposition reaction. Metal oxide containing catalysts may be employed although usually they are not as effective in complete clean-up of the nitrogen oxide fumes as are the noble metal catalysts. For those reactions in which maximum clean-up is not required, such metal catalysts as nickel supported on activated alumina, copper chromite, fused metal oxide catalysts, such as are described in the A. T. Larson patent, U.S. 2,061,470 may be used. An especially suitable catalyst for this reaction with a light-off temperature, however, somewhat above that of the noble metal catalysts is one prepared from basic metal carbonate and ammonium carbonate disposed on finely divided alumina hydrate as described in the A. B. Stiles U.S. Patent 2,570,882. Reforming catalysts may likewise be used, examples of which are the nickel promoted catalysts and the other metal of the ion group metal oxide promoted catalysts of the R. Williams U.S. Patent 2,119,565 and the catalysts of the J. C. Woodhouse U.S. Patent 2,064,867.

Table I given below illustrates the effectiveness of the invention in the treatment of fumes containing 0–5% $O_2$; 0–6% $N_2O$; 0–1% $NO_2$; and 88–99% $N_2$.

In Table II the fumes rendered innocuous, identified by the letter "A," are a mixture of nitrogen oxides containing fumes of the unabsorbed effluent from the oxidation of ammonia to nitric acid and fumes, identified by the letter "B," are the effluent from the nitric acid oxidation of a mixture of organic alcohols and ketones to dibasic acids.

The invention described is adaptable for the treatment of nitrogen-oxide containing-gases from any source and is for use particularly in localities where undue air pollution is to be avoided. The reduction of nitric oxide fumes resulting from the oxidation and nitration of or-

*Table I*

| Catalyst | Bed[1] Temp., °C. | Fumes,[2] s.c.f.h. | Natural Gas, s.c.f.h. | Space Velocity, (hr.$^{-1}$) | Linear Velocity, ft./sec. | Excess Natural Gas (percent) | Nitrogen Oxides Leakage (p.p.m.) |
|---|---|---|---|---|---|---|---|
| 1. Nickel and Aluminum Oxides | 960 | 45.3 | 2.6 | 53,300 | 4.2 | 100 | 25 |
|  | 1,020 | 45.3 | 2.0 | 52,600 | 4.2 | 100 | 25 |
|  | 960 | 45.3 | 1.9 | 52,400 | 4.1 | 100 | 2,000 |
| 2. 0.5% Platinum on Alumina (Baker). | 450 | 38.4 | 2.3 | 0,800 | 3.6 | 98 | 25 |
|  | 790 | 75.7 | 2.6 | 78,300 | 6.9 | 31 | 25 |
|  | 460 | 59.0 | 1.8 | 121,700 | 5.3 | 20 | 2,000 |
|  | 690 | 59.0 | 1.8 | 121,700 | 5.3 | 20 | 25 |
| 3. 0.5% Platinum on (Houdry 72J7-3C) Hard Alumina. | 530 | 48.1 | 2.5 | 50,600 | 4.4 | 76 | 25 |
|  | 580 | 58.1 | 2.5 | 60,600 | 5.3 | 76 | 25 |
| 4. 0.5% Platinum on (Houdry 72J7-4C) Hard Alumina | 650 | 58.1 | 2.5 | 60,600 | 5.3 | 76 | 25 |
| 5. 0.5% Platinum on Alcoa Activated Alumina (Grade H-151) | 770 | 58.1 | 2.5 | 60,600 | 5.3 | 76 | 25 |
| 6. Platinum Wool | 1,020 | 39.9 | 2.5 | 42,400 | 3.7 | 76 | 100 |
| 7. 0.5% Palladium on Norton (5103) Alumina (Low Surface Area) | 970 | 33.9 | 2.4 | 36,300 | 3.2 | 79 | 1,000 |

[1] Temperature of inlet fumes: 100–300 °C.
[2] Fume compositions covered: 0–5% $O_2$; 0–6% $N_2O$; 0–1% $NO_2$; 88–99% $N_2$.

*Table II*

| Runs | Catalyst | Bed Temp., °C. | Fumes, s.c.f.h. (A) | Fumes, s.c.f.h. (B) | Ft./Sec. Fumes | Hydrogen Used, s.c.f.h. | Percent Excess Hydrogen of Stoic., Percent | Natural Gas Used, s.c.f.h. | Percent Excess Natural Gas of Stoic., Percent | Nitrogen Oxides Leakage (p.p.m. NO) |
|---|---|---|---|---|---|---|---|---|---|---|
| 8 | Platinum Hydgn. Cat. 7" bed. | 725 | 9,420 | 1,550 | 3.9 | 906 | 60 | 550 | 46 | 8 |
| 9 | 0.5% Platinum on Alumina (⅛" pellets) (Baker) 4" bed. | 615 | 15,300 | 15,300 | 5.4 | 353 | 26.3 | 472 | 40 | 0 |
|  |  | 860–830 | 15,300 | 15,300 | 5.4 | 250 | 19 | 416 | 24 | 25 |
|  |  | 710 | 15,700 | 15,700 | 5.6 | 354 | 26 | 416 | 24 | 0 |
| 10 | 0.5% Platinum on Alumina 4" bed. | 710 | 17,900 | 2,750 | 7.3 | 485 | 17 | 953 | 37 | 0 |
| 11 | 0.5% Rhodium on Alumina (Baker) ⅛"–5" bed. | 770 | 15,300 |  | 5.4 | 0 | 0 | 510 | 52 | 5 |
| 12 | 0.5% Rhodium on Alumina (Baker) 5" bed. | 770 | 15,300 | 2,750 | 6.4 | 433 | 17 | 931 | 46 | 12 |
| 13 | 0.5% Platinum on Hard Alumina (Baker) 5" bed. | 750 | 15,300 | 2,750 | 6.4 | 411 | 16 | 765 | 22 | 50 | ganic compounds and nitric fumes resulting from the manufacture of nitric acid, have been successfully accomplished by the technique described herein to give an effluent gas containing no detectable quantities of nitrogen oxide.

We claim:

A process for the disposal of waste gas containing nitrogen oxide fumes which comprises passing said waste gas together with a reducing gas, containing 60 to 90% of an alkane, said reducing gas being present in an amount in excess of the stoichiometric amount necessary to decompose the nitrogen oxide fumes, over a catalyst of platinum supported on activated alumina at a temperature between 450° C. and 1000° C., at a space velocity of between 25,000 and 150,000 reciprocal hours per cubic foot of catalyst, whereby the nitrogen oxide fumes are reacted with the reducing gas to form nitrogen, water and carbon dioxide, and thereafter discharging the nitrogen-oxide free waste gas to the atmosphere.

References Cited in the file of this patent

UNITED STATES PATENTS

| | | |
|---|---|---|
| 1,962,485 | Dely | June 12, 1934 |
| 2,381,696 | Shapleigh | Aug. 7, 1945 |

FOREIGN PATENTS

| | | |
|---|---|---|
| 476,684 | Great Britain | Dec. 13, 1937 |

OTHER REFERENCES

Mellor: "Comprehensive Treatise on Inorganic and Theoretical Chemistry," Longmans, Green and Company, New York, New York, volume 8, 1938, page 396.

Rideal and Taylor: "Catalysis in Theory and Practice," The MacMillan Company, New York, New York, 2nd edition, 1926, page 246.

Dixon and Vance: "The Reaction Between Nitrous Oxide and Hydrogen on Platinum," The Journal of the American Chemical Society, volume 57, January-June 1935, pages 818–821.

UNITED STATES PATENT OFFICE

CERTIFICATE OF CORRECTION

Patent No. 3,125,408                      March 17, 1964

Eugene Childers et al.

It is hereby certified that error appears in the above numbered patent requiring correction and that the said Letters Patent should read as corrected below.

Column 3, lines 21 and 22, for "compartively" read -- comparatively --; columns 3 and 4, Table I, under the heading "Catalyst", item 4, for "Hard Alunina" read -- Hard Alumina --; same table, under the heading "Space Velocity, (hr. $^{-1}$)" line 4 thereof, for "0,800" read -- 40,800 --; column 6, line 12, for "1938" read -- 1928 --.

Signed and sealed this 28th day of July 1964.

(SEAL)

Attest:

ESTON G. JOHNSON                      EDWARD J. BRENNER
Attesting Officer                       Commissioner of Patents